Feb. 15, 1966 T. V. SELING 3,235,731
COMPARISON MICROWAVE RADIOMETER
Filed July 2, 1962

INVENTOR.
Theodore V. Seling
BY
Paul J. Ethington
ATTORNEY

3,235,731
COMPARISON MICROWAVE RADIOMETER
Theodore V. Seling, Lansing, Mich., assignor to General Motors Corporation, Detroit, Mich., a corporation of Delaware
Filed July 2, 1962, Ser. No. 206,566
12 Claims. (Cl. 250—83.3)

This invention relates to microwave radiometry and, more particularly, to a comparison radiometer having a reference noise source with a variable duty cycle.

A radiometer is an instrument for measuring radiant energy. Characteristically, it is a receiver for detecting microwave thermal radiation and similar weak, wideband signals that resemble noise, and which are obscured by receiver noise and gain fluctuations. The "noise" refers to low amplitude A.C. signals which occur over a wide frequency spectrum and are not readily recognized. In a microwave radiometer, noise is an undesired electrical disturbance which interfers with the normal processing of a desired signal.

Thermal radiation in the microwave frequency range provides extremely weak input signals for the radiometer system. For example, the thermal radiation from the earth has an approximate power of one micro-microwatt measured over a 1000 megacycle bandwidth. Therefore, an extremely sensitive receiver is required to detect the presence of such signals. The major difficulty in achieving the required sensitivity is the elimination of random noise in the form of gain fluctuations which is generated within the receiver system. A method currently known for reducing the difficulties presented by the existence of system gain fluctuations is the use of a comparison radiometer. In such a radiometer, a receiver is continually switched between two inputs. The first of these inputs is taken from the radiometer antenna and consists of the signal which is received from a thermally radiating body, hereinafter referred to as a target, plus the random thermal noise generated within the system. The second input to the receiver consists of an artificially generated reference noise disturbance plus the random thermal noise generated within the system. The signal representing the target is the difference in the amplitude of the receiver output that occurs when the receiver is switched alternately between the two inputs. If the temperature of the background at which the antenna is pointed is equal to the temperature of the reference source, then the change in the receiver output when switched between the two inputs is zero. However, when a target is present, there is a difference between the two inputs which is detected by the receiver as a square wave superimposed on a large D.C. voltage. The D.C. voltage is proportional to the background temperature including the random thermal noise generated within the system, while the amplitude of the generated square wave is proportional to the difference between the target temperature and the reference noise source. Any gain variations occurring when the target is present will produce variations in the D.C. voltage and the square wave voltage proportional to the magnitude of the variation. Thus, if the D.C. voltage is filtered out, the magnitude of the square wave will vary in proportion to the fractional change in receiver gain resulting in errors in measurement. In sensitive microwave radiometers, this error can be as great or greater than that caused by thermal noise effects in the signal and radiometer system. A better understanding of a system of this general type can be obtained by referring to a copending application, United States Serial Number 745,760, filed June 30, 1958, now Patent No. 3,129,330, in the name of the present inventor and assigned to the assignee of this application.

The above-mentioned comparison type radiometer can be used as a means for thermal mapping or detection. In such an application, the radiometer antenna is mounted on an airplane and is used to detect the presence of "hot" or "cold" bodies with respect to a reference or background. The background may be, for example, either earth or water. Let us assume that the radiometer is to be used for detecting the presence of ships on the ocean. In this case, the radiometer system would be adjusted to obtain a null condition while the antenna is pointed toward unoccupied water. When the highly directionalized antenna later is directed toward a ship, a deviation from the null condition is produced, which deviation indicates the presence of a target. If the ship has a steel superstructure the received signal will indicate the presence of a "cold" body, whereas a wood superstructure registers as a "warm" body.

Considering the above-mentioned radiometer, it can be seen that the system must be manually reset to a null position in accordance with the thermal characteristics of the background. An improvement on such a system has been made where the reference noise source is a continuously variable source and regulated by feedback means which conditions the system to a null at all times. Such a system does not require manual nulling in accordance with different backgrounds. In the feedback-nulled system, the noise source may be a variable current crystal diode, for example. The radiometer receiver then is continuously switched between the antenna and the noise source. An error detector which produces an output proportional to the difference between the two signals is connected in a feedback loop with the variable noise source. The radiometer receiver or detector is then effective to generate an error signal when the input from the radiometer antenna differs from that of the noise source. The minimum and maximum limits of the noise source signal are then determined by the minimum and maximum expected signals to be detected. The error signal from the radiometer receiver system is then connected to a current source which continuously regulates the current through the crystal diode. It can be seen that such a system is rendered almost completely insensitive to system gain fluctuations. The controlling parameter of the variable noise source is then a measure of the change in antenna temperature. Another method of making radiometer indications, to which the same considerations as just made may be applied, is the use of a manually or automatically variable attenuator coupled with a constant amplitude noise source.

A common difficulty encountered through the use of both of the above type systems is the nonlinearity of the noise sources. Also, it has been found that in such applications the stability of the crystal diode noise sources is only fair and the characteristics change considerably if the sources are subjected to excess current or otherwise mishandled.

The present invention provides a still further improvement in the field of comparison type radiometers. The present invention proposes the use of a noise source with a variable duty cycle or "on" time to adjust the average temperature of the reference termination in order to obtain a null condition. This is to be distinguished from variable current flow noise sources which are "on" continuously, but with varying magnitudes. This system has been found to be relatively insensitive to overloads or mishandling, and the accuracy is determined only by the accuracy of the timing circuit.

It is therefore the object of the present invention to provide a variable temperature noise source to be used as a comparison or reference source in a comparison radiometer. The noise source is smoothly and continuously variable and can be used as a manually variable standard, or as an automatically variable comparison reference controlled by a feedback system. In the former case, the noise source is continuously switched on and off at a rate much faster than the switching time of the comparison radiometer switch. The radiometer is then manually adjustable to a null condition when the antenna is directed toward an unoccupied background. In the latter case, the feedback system is effective to sense a difference between the antenna temperature and the comparison termination temperature, and to change the comparison temperature in a direction tending to reduce this difference to zero. The switching rate of the noise source in the later case can be made synchronous with the radiometer switching rate although this is not a necessary requirement. It will be seen that the present invention proposes an improvement to both of the previously discussed methods of radiometer detection.

The objects and advantages of the present invention will be more readily apparent upon reading of the following descriptions of two illustrative embodiments of the invention taken with the accompanying drawings, of which:

Figure 1:
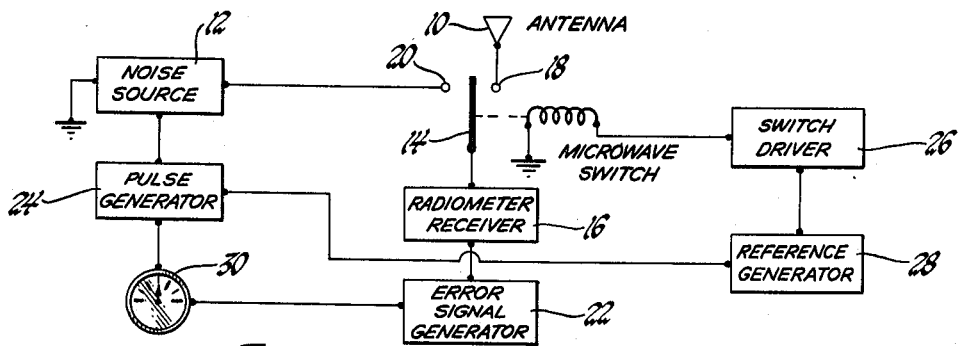
FIGURE 1 is a block diagram of a simplified radiometer system employing the present invention.

Referring now to FIGURE 1, there is shown a comparison type radiometer which is effective to continuously match the input signals from an antenna 10 with the signal generated in a noise source 12 in order to indicate the existence of thermally radiating targets within the directed range of the antenna 10. The system employs a microwave or suitable switch 14 which is effective to connect a radiometer receiver 16 alternately to an antenna termination 18 and a reference termination 20. The receiver 16 is designed for wide band, low noise operation and may be similar to a conventional superheterodyne radar receiver made up of a TWT amplifier or a parametric amplifier or maser. The receiver 16 is effective to amplify and detect the signals obtained by switching alternately between the terminations 18 and 20 and to apply the detected square wave to an error signal generator 22. A pulse generator 24 is coupled with the noise source 12 and is effective to control the on-off condition of the noise source. The pulse generator 24 is controlled in turn by the output of the error signal generator 22 such that the average temperature of the noise source 12 is equal to that of the antenna 10. It should be noted that when the noise source 12 is on, the magnitude of the output is constant. The switch 14 is shown controlled by a switch driver 26 which receives its input signals from a reference timing generator 28. Although the switch 14 is portrayed in the drawing as being of a mechanical nature, it is to be understood that the frequency of operation may require a more suitable arrangement to microwave or RF frequencies. The switch 14, and also the switches similarly portrayed in FIGURE 2, may, for example, be ferromagnetic switches of the Faraday rotational type. The required characteristics are low insertion loss and a speed of operation which is fast compared to the maximum signal frequencies. The switch driver 26 will be of a form compatible with the particular switch employed. A meter 30 is coupled between the pulse generator 24 and the error signal generator 22 and provides a direct reading of the magnitude of the antenna signal appearing at the antenna termination 18.

Briefly stated, the system shown in FIGURE 1 is adapted to detect the magnitude of the thermal radiation signal picked up by the antenna 10 and to generate a corresponding reference signal which appears on the reference termination 20. The reference signal is equal in magnitude to the antenna signal appearing on the termination 18 to thereby cancel the two signals and obtain a null condition. This is accomplished by varying the proportion of the radiometer cycle over which the noise source 12 is activated. This may be accomplished by directly pulsing the noise source or by switching an attenuator. Effectively, the two methods are equivalent. When the apparent temperature of the termination 18 increases, the "on" portion of the noise source 12 cycle must increase such that the average temperature of the reference termination 20 increases accordingly. The meter 30 will, thus, read the average power supplied to the noise source 12 and indicate the noise power required to cancel the radiometer antenna signal.

Assuming that switch 14 is actuated such that the termination 18 is contacted for the same length of time per cycle as the termination 20, then the average signal applied to the receiver 16 will be half of the algebraic sum of the two signals. Similarly, the apparent temperature of the termination 20 will be determined by the ratio of the time during which the noise source 12 is on, to the average time during which the switch 14 contacts the termination 20. Clearly, if the cycle length of the on time of the noise source 12 is equal to half of the cycle length of the switch 14, the termination 20 will attain the maximum temperature of the noise source 12.

In operation, the reference generator 28 provides a signal to the switch driver 26 which causes the switch 14 to contact the termination 18. At the same time, the pulse generator 24 is off. Now as the reference generator 28 causes the switch driver to allow the switch 14 to contact the termination 20, the pulse generator 24 turns on the noise source 12. Therefore, the noise source 12 is on when the radiometer receiver 16 is switched to the comparison termination 20. The noise source 12 will remain on sufficiently long for the previously mentioned null condition to be reached. Therefore, it can be seen that the pulse width from the pulse generator 24 is a function of the difference between the antenna signal and the apparent temperature of the reference termination 20. The end of the pulse occurs when a predetermined temperature of the termination 20 sufficient to effect the null is reached, and this condition causes the noise source 12 to be turned off by means of the connection between the error signal generator 22 and the pulse generator 24. The meter 30 may, thus, be calibrated in terms of pulse width to indicate the duration of on time of the noise source 12 required to establish an average effective temperature at termination 20 which equals the temperature of termination 18.

A suitable variable noise source is a gas discharge tube in which a variable on time adjusts the average temperature of the comparison termination of the radiometer. The argon gas discharge tube has been shown to be a very stable microwave noise generator. It is apparent that if the argon gas discharge tube is turned on at the beginning of the time the radiometer is switched to the comparison termination 20 and turned off or completely attenuated during that time, the average temperature of the comparison termination 20 is:

$$T_{AV} = (T_N - T_O)\frac{t_1}{t_2} + T_O \qquad (1)$$

where:

$T_{AV}$ equals the average temperature of the comparison termination;
$T_N$ equals the maximum noise source temperature;
$T_O$ equals ambient temperature;
$t_1$ equals the "on" time of the noise source 12; and
$t_2$ equals the length of time the radiometer is switched to the comparison termination.

It can be seen that if $t_1$ is varied over the range between 0 and $t_2$ the average temperature will range from ambient to the full temperature of the noise source 12.

As previously mentioned, the system is also to be employed to detect cold targets; that is, targets having an effective temperature less than ambient. In this application, the lower range of the system can be extended by suitably cooling the reference termination 20 during the off time of the discharge tube. This may be accomplished by mounting the gas discharge tube in the center of a wave guide such that the noise is propagated in either direction down the wave guide.

Figures 2, 3:
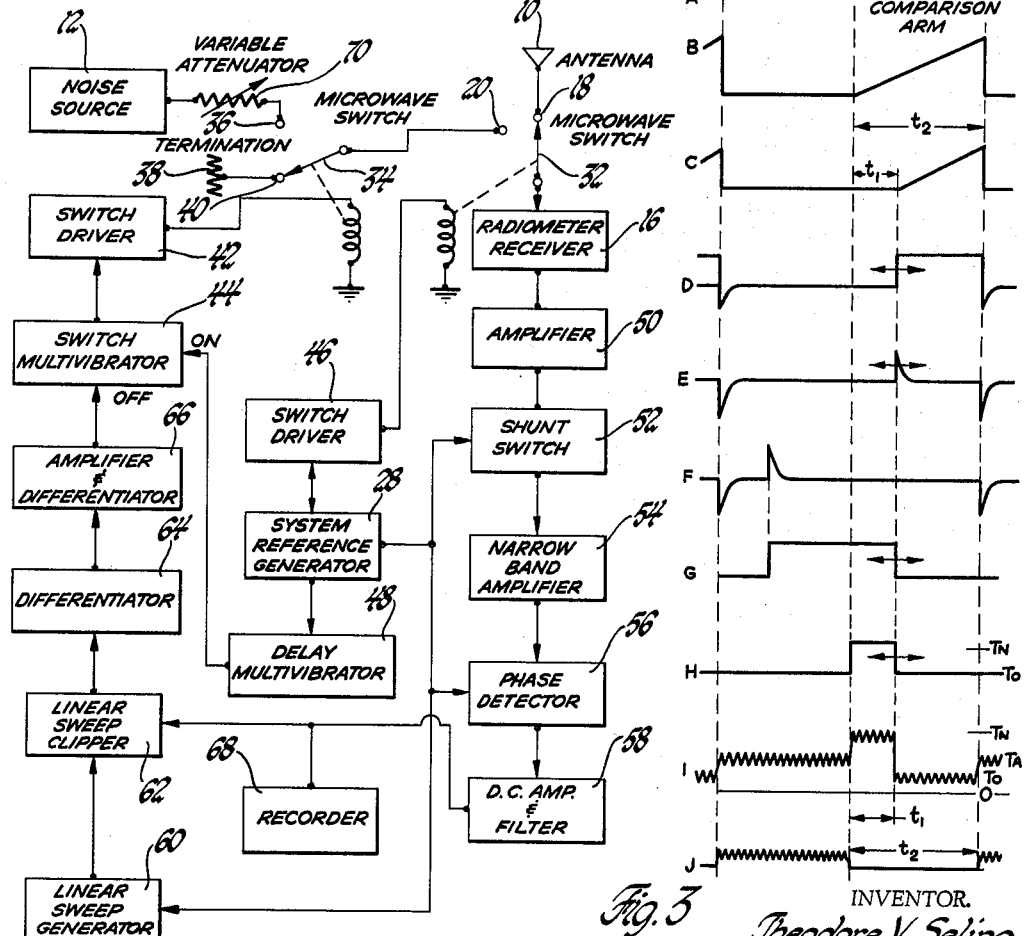
FIGURE 2 is a block diagram showing, in a more complete manner, a mode of practicing the present invention.
FIGURE 3 is a diagram of the signal wave forms present at various points in the circuit of FIGURE 2.

It is to be understood that the conductive connections shown in FIGURES 1 and 2 are representative of the proper wave guide configurations necessary to high frequency operation. One end of the wave guide in which the gas tube is mounted is connected with the comparison termination 20 and the other end is connected to a termination which can be thermally regulated. When the gas discharge tube is on, the effective temperature of termination 20 will be that of the gas discharge tube. The highly attenuating character of the discharge will act as an insulator between the termination 20 and the thermally regulated end of the wave guide. When the gas discharge tube is off, the attenuation ceases and the effective temperature of the termination 20 will be that of the thermally regulated end of the wave guide. The temperature of this termination can be controlled as desired.

Referring now to FIGURE 2, there is shown an embodiment of the present invention in a feedback controlled radiometer system with a variable duty cycle noise source. Corresponding components in FIGURES 1 and 2 are identified with corresponding reference characters. This system employs a radiometer antenna 10 and an argon gas discharge noise source 12. The antenna 10 is connected to an antenna termination 18 which is connectable by means of the microwave switch 32 to a radiometer receiver 16. The microwave switch 32 is also connectable to a comparison termination 20. The comparison termination 20 is coupled to a second microwave switch 34 which may be coupled to either the noise source 12 by means of a terminal 36 or to a reference termination 38 by means of a terminal 40. The reference termination 38 is used to determine the minimum signal detectable by the radiometer system. Similarly, the maximum apparent temperature of the noise source 12 determines the maximum detectable signal of the radiometer system. The microwave switch 34 is controlled by a switch driver 42 which is turned on and off by a multivibrator 44. Similarly, the microwave switch 32 is controlled by a switch driver 46.

It should be noted that the argon tube noise source 12 is actually discharging continuously. However, the actual on-off switching of the noise source is accomplished by means of the microwave switch 34 which couples the reference termination 20 to the terminals 36 and 40 alternately in response to the turning on and off of the switch multivibrator 44. This differs from the system of FIGURE 1 wherein the noise source 12 was actually pulsed on and off. A system reference generator 28 forms the timing reference cycle for the entire system and is coupled directly to the switch driver 46 and indirectly to the switch multivibrator 44 through a delay multivibrator 48. The delay multivibrator 48 is effective to cause a delay between the switching of the radiometer receiver 16 to the comparison termination 20 and turning on of the switch multivibrator 44. This delay is to prevent leakage of the reference noise into the radiometer receiver 16 during switching and also to allow the noise source 12 to stabilize before being sampled by the microwave switch 34. The signal from the radiometer receiver 16 is coupled through an amplifier 50 which is effective to amplify the signal to a usable level for application to a shunt switch 52. At a suitable level, the signal from the amplifier 50 is passed through the shunt switch 52 which grounds the signal during the comparison time. The shunt switch 52 is used to average that part of the waveform received when the microwave switch 32 is connected to termination 20. The output of the shunt switch 52 is a square wave whose amplitude is proportional to:

$$\frac{T_A - T_{AV}}{2} \qquad (2)$$

Where:

$T_A$ equals the antenna temperature;
$T_{AV}$ equals the average temperature of the comparison termination.

The noise is shunted to ground during the comparison time so the signal to noise ratio is not degraded. The shunt switch 52 is also connected to the system reference generator 28 and is basically controlled thereby. The signal from the shunt switch 52 is coupled through a narrow band amplifier 54 to a phase detector 56. The amplifier 54 provides additional gain to increase the output signal of the shunt switch 52 to a suitable level for application to the phase detector 56. The amplifier 54 is narrow band to reduce the effects of noise.

The phase detector 56 is provided to indicate to the system the polarity of the signal from the shunt switch 54 as given by Formula 2. This is accomplished by multiplying the signal voltage by a reference voltage. The output is a D.C. voltage proportional to the signal amplitude and the cosine of the phase angle between the reference and signal voltages. The phase detector 56 is time referenced to the operational cycle of the switch 32 by means of a connection with the system reference generator 28.

The output signal from the phase detector 56 is transmitted to a D.C. amplifier and filter 58 which provides a signal suitable for application to subsequent system elements. The filter action allows passage of only signals within the signal spectrum. This maximizes the signal to noise ratio by filtering out any extraneous noise occurring outside the signal pass band. A typical amplifier for this purpose is a chopper stabilized operational amplifier with RC feedback networks.

The output voltage of the D.C. amplifier and filter is transmitted as a first input signal to a linear sweep clipper circuit 62. The clipper circuit 62 makes up part of a timing control circuit arrangement which determines the operation of microwave switch 34. This timing circuit arrangement further comprises a linear sweep generator 60 which is connected to the system reference generator 28. The sweep generator 60 is effective to produce a linearly increasing saw-tooth output voltage signal to the linear sweep clipper circuit 62. The linear sweep clipper circuit 62 is essentially a voltage comparator which produces an output only when the magnitude of the second input from the generator 60 exceeds that of the first input from the D.C. amplifier and filter 58. As will be seen in the following, the amplitude of the D.C. signal from the amplifier and filter 58 will be effective to determine the on time of the noise source 12 and, thus, the average temperature of the reference termination 20.

In order to accomplish the desired comparison, the output of the clipper circuit 62 is coupled through a first differentiator 64 and a second differentiator and amplifier 66 to the switch multivibrator 44.

To determine the duration of the on time of the noise source 12, a recorder 68 is coupled to the circuit between the D.C. amplifier and filter 58 and the clipper circuit 62. The particular location of the recorder 68 in this position is not critical. It should be apparent that the recorder 68 may be positioned in the circuit at any point at which it is possible to determine the duration of the on time of the noise source 12.

As was previously mentioned, the switch multivibrator 44 is turned on by the system reference generator 28 shortly after the microwave switch 32 has been switched to the antenna termination 18. Thus, the combination of the switch multivibrator 44, the switch driver 42 and the microwave switch 34 is effective to turn on the noise source 12 as the radiometer receiver 16 is switched to the antenna 10.

When the system reference generator 28 acts upon the switch driver 44 to switch the microwave switch 18 to the comparison termination 20, the microwave switch 34 is still holding the noise source 12 on. The noise source 12 is then on when the radiometer receiver 16 is switched to the comparison termination 20 and it will remain on until a turn-off pulse is received from the linear sweep clipper 62. This turn-off time is a linear function of the voltage applied to the linear sweep clipper circuit 62 from the D.C. amplifier and filter 58. The voltage from the D.C. amplifier and filter 58 is in turn directly proportional to the signal from the receiver 16. Thus, the average temperature of the comparison termination 20 as previously mentioned is given by Formula 1.

Summarizing briefly, the signal from the radiometer receiver 16 is amplified to a more useable level by the amplifier 50 and phase detected by the detector 56. The output of the detector 56 is a D.C. voltage proportional to the difference between the temperature $T_A$ of the antenna termination 18 and the average temperature $T_{AV}$ of the comparison termination 20. This voltage is used to control the output of the linear sweep clipper circuit 62. Thus, is defined a closed loop feedback system wherein the voltage applied to the linear sweep clipper circuit 62 is a record and measure of the antenna 10 signal.

Considering now the circuit of FIGURE 2 in greater detail, the argon discharge tube which comprises the noise source 12 is coupled to the terminal 36 through a variable attentuator 70. As was previously mentioned, the magnitude of the signal from the noise source 12 is effective to establish the maximum detectable signal by the radiometer system. Thus, if extremely weak signals are anticipated, the noise source 12 may be attenuated somewhat by the variable attenuator 70 so as to cause the signal appearing on the terminal 36 to be of a suitable magnitude. The terminal 40 will have an effective temperature equal to that of the reference termination 38. Since the apparent temperature of the terminal 40 will determine the minimum signal amplitude detectable by the radiometer system it is desirable to maintain the termination 38 at an extremely low absolute temperature. By cooling a resistor with helium, the molecular acitvity of the resistor can be retarded to an effective temperature of approximately 4° Kelvin.

It has been shown that the average effective temperature of termination 20 is expressed by Formula 1. That is, the average temperature is a function of the signal on terminal 36, the signal on terminal 40, and the proportion of time which the microwave switch 34 spends on each of the terminals 36 and 40. It has also been shown that the signal applied to the receiver 16 is expressed by Formula 2. That is, the signal applied to the receiver 16 is the time average of the difference between the signals provided at terminations 18 and 20. This difference may be used as a direct reading of the radiometer signal or, as in FIGURE 2, it may be applied to a feedback system which is effective to alter the comparison signal on termination 20 in such a manner that the system is always at null.

Referring now to FIGURE 3, line A, the cycle of operation of the microwave switch 32 is shown to be a square wave function whose period is determined by the system reference generator 28. The switch to the comparison termination occurs at time $t_0$. The input to the receiver 16 is then regulated by the switching times of the feedback system and takes the form shown in FIGURE 3 I. The output of the radiometer receiver 16 is amplified in the A.C. amplifier 50, while retaining the original wave form as indicated in FIGURE 3, line I. This voltage is applied to the shunt switch 52 which, through its actuation by the system reference generator 28 is effective to average the signal during the comparison time. Since the comparison time, that is the time the microwave switch 32 is connected to the termination 20, is equal to the signal time, that is the time the microwave switch 32 is connected to termination 18, the output of the shunt switch will then be a square wave whose amplitude is a time average of the voltage applied to the radiometer rceiver 16. The output of the shunt switch is shown in FIGURE 3J. Thus, the signal output of the shunt switch 52 after being amplified in the amplifier 52 is applied to the phase detector 56. The output of the phase detector will be a D.C. voltage proportional to the difference $T_A - T_{AV}$. The phase detector 56 is effective to determine the amplitude of the D.C. voltage and whether this difference voltage is positive or negative, and, thus, whether the signal appearing on comparison termination 20 is greater than or smaller than the signal appearing on termination 18. Obviously, if the average of the signal appearing on termination 20 is greater than that appearing on termination 18, the feedback system must act to increase the proportion of time during which the microwave switch 34 couples the comparison termination 20 to the terminal 40. In the event the signal on termination 18 is the larger, the phase detector 56 will, thus, apply a signal of opposite phase to the D.C. amplifier 58, which, acting through the feedback system, will be effective to increase the proportion of time the switch 34 spends connected to the noise source terminal 36.

Referring again to the feedback circuitry of FIGURE 2, which is effective control the operation of the switch 34, and, thus, the on time of the noise source 12, recall that the system reference generator 28 determines the cycles of operation of each of the microwave switches 32 and 34. The system reference generator 28 applies a signal to the switch divider 46 and to the delay multivibrator 48 and to the linear sweep generator 60 simultaneously. The time at which this signal occurs is indicated as $t_0$ in FIGURE 3. At this point the output of the linear sweep generator is shown in FIGURE 3B. The sweep generator 60 produces a linear sawtooth wave form equal in duration to the comparison time $t_2$. That is, equal to half of the period of the cycle of microwave switch 32. It has been stated that the input voltage to the linear sweep clipper circuit 62 from the D.C. amplifier and filter 58 is a function of the difference between the signals appearing on terminations 18 and 20. This voltage is effective to control the output of the linear sweep clipper 62, such that the microwave switch 34 will couple the noise source 12 to the comparison termination 20 for a sufficient portion of the comparison time period to make $T_{AV}$ equal to $T_A$.

The positive voltage spike in the output of the delay multivibrator 48, which is shown in FIGURE 3F turns the switch multivibrator 44 on after a delay when the radiometer is switched to the antenna termination 18. This delay is to allow the noise source to be turned on and stabilized while preventing leakage of the reference noise into the radiometer during switching. The noise source 12 then on when the radiometer is switched to the comparison termination 20 and stays on until a turn off pulse is received from the linear sweep clipper circuit 62. The output of the clipper circuit 62 is shown in FIGURE 3C. The voltage applied to the clipper circuit 62 from the D.C. amplifier 58 is effective to bias the clipper circuit 62 off for a time $t_1$. This time, $t_1$, is, thus, a function of difference between the antenna and the comparison signals. When the output from the sweep generator 60 exceeds the bias voltage from the amplifier and filter 58, the output of the linear sweep clipper circuit 62 is a linear ramp voltage equal to the remaining proportion of the time $t_2$. When the ramp output of the linear sweep clipper circuit 62 is applied to the differentiator 64, a constant amplitude square wave signal is generated, as shown in FIGURE 3D, equal in duration to $t_2 - t_1$. When the output of the differentiator 64 is again differentiated by the amplifier and differentiator 66, the signal shown on line E of FIGURE 3 is the result. The positive voltage spike of FIGURE 3E is then applied as an off signal to the switch multivibrator 44. When the switch multivibrator 44 has received this signal, it will turn off the switch driver 42, and, thus, the microwave switch 34 will couple the comparison termination 20 to the terminal 40 for the remainder of the comparison period. The output of the switch multivibrator 44 is shown in FIGURE 3G. At the end of the time $t_2$, the receiver 16 is again coupled to the antenna termination 18 and the cycle repeats. The effective output of the noise source 12 is, thus, shown on line H of FIGURE 3, as a constant amplitude square wave having a duration equal to $t_1$. The noise source is thus turned on for a period $t_1$ sufficient to cause $T_{AV}$, the signal appearing on the reference termination 20, to equal the signal appearing on the antenna termination 18.

If a large dynamic range of radiometer signals is expected, or if a logarithmic response is desired, the output of the sweep circuits 60 and 62 may be an exponential function rather than linear as described herein.

As was suggested earlier, the variable duty cycle noise source can be applied to a non-feedback system. In such a non-feedback system, the aforementioned relationship between the cycle of operation of the microwave switch 32 and the microwave switch 34 will still exist. This is, the receiver 16 will be coupled alternatively to the antenna and the noise source for constant time periods of predetermined duration. The noise source 12 is on for a variable portion of the comparison time. This variable portion is manually set to provide an average noise source temperature equal to the antenna temperature. The primary difference in such a system is that the on time $t_1$ is not determined by an error signal but is manually set to null the system when the antenna 10 is directed toward a background. Similarly, the connection between the recorder 68 and the sweep generator 60 would not be employed but rather the radiometer receiver 16, coupled with suitable phase detecting apparatus, would be coupled directly to the recorder 68 to provide a direct reading of the radiometer signal. For example, if the system were to be used to detect aircraft, the antenna 10 would be aimed at the sky. The on time of the noise source 12 should be manually adjusted such that the average temperature appearing as a signal on the comparison termination 20 would be equal to the background signal provided on the antenna termination 18. Thus, the average input to the receiver 16 would be zero when no target appears within the range of the antenna 10. When such a target does appear the effective temperature of the termination 18 will, thus, vary according to whether the target is colder or warmer than the background. The amplitude of the phase detected signal would then be a direct indication of the presence of a target. It can be seen that in such a system the variable noise source 12 can be either controlled by a dual termination system such as that employing terminal 36 and 40 or it may be obtained by directly pulsing the noise tube. Such direct pulsing eliminates the requirement for the microwave switch 34.

While the invention has been shown and explained with reference to a specific embodiment thereof, it is to be understood that the invention is not so limited and that various modifications may be made without departing from the spirit and scope of the invention. For a definition of the invention, reference should be made to the appended claims.

What is claimed is:

1. A microwave radiometer for detecting the presence of bodies radiating microwave energy comprising the combination of an antenna for producing a signal related to the temperature of a body radiating microwave energy thereto, a signal reference source of microwave energy of constant magnitude, receiving means having an input and an output and adapted to produce an output signal corresponding to the difference between two alternately applied input signals, switching means connected to the input of the receiving means and adapted to cyclically couple the input alternately to the antenna and the reference source in respective half-cycles of fixed duration, actuating means connected to the reference source and synchronized with the switching means to interrupt the flow of energy from the reference source to the receiving means over a predetermined portion of the half-cycle during which the switching means couples the input of the receiving means to the reference energy source.

2. A microwave radiometer for detecting the presence of a target radiating microwave energy comprising the combination of an antenna for producing a signal related to the absolute temperature of a target radiating microwave energy thereto, a signal reference source of microwave energy of constant magnitude, receiving means having an input and an output and adapted to produce an output signal corresponding to the difference between two alternately applied input signals, switching means connected to the input of the receiving means and adapted to cyclically couple the input alternately to the antenna and the reference source in respective partial cycles of switching means operation, the partial cycles each being of fixed duration, signal responsive actuating means having an input and an output, the output being connected to the reference source and synchronized with the switching means to interrupt the flow of energy from the reference source over a predetermined variable portion of the partial cycle during which the switching means couples the input of the receiving means to the reference source, the output of the receiving means being interconnected with the input of the actuating means to thereby vary the predetermined variable portion such that the output signal of the receiving means tends toward zero.

3. A microwave radiometer for detecting the presence of microwave energy radiating targets comprising the combination of an antenna for producing a signal related to the absolute temperature of a target radiating microwave energy thereto, a signal reference source of microwave energy of predetermined magnitude, receiving means having an input and an output and adapted to produce an output signal corresponding to the average of the difference of two input signals alternately applied thereto, switching means coupled to the input of the receiving means, driving means operatively connected with the switching means to alternately connect the input of the receiving means to the antenna and the reference source, trigger means connected to the reference source and adapted to produce first and second signals to activate and deactivate the reference source in response thereto, variable timing means to vary the time interval between the first and second signals, the temperature of the reference source being related to the time interval between the first and second signals, and detector means connected to receive the output signal from the receiving means and adapted to indicate a difference between the temperature of the antenna and the reference source.

4. A microwave radiometer for detecting the presence of microwave energy including an antenna for producing a signal corresponding to the microwave energy radiated thereto, a signal reference source of microwave energy of predetermined magnitude, receiving means having an input and an output and adapted to produce an output signal corresponding to the difference between two signals alternately applied to the input, switching means cyclically operative to alternately connect the input of the receiving means to the antenna and the reference source during first and second semi-cycles of operation, reference timing means having an output connected to the switching means to determine the cycles of switching thereof, actuating means having an input and output, the output being connected to the reference source, the output of the timing means being connected to the input of the actuating means whereby the reference source is operative during a predetermined portion of the second semicycle, the output of the receiving means being interconnected with the input of the actuating means whereby the reference source is inoperative after the predetermined portion of the second semicycle, the predetermined portion being varied in accordance with the output signal of the receiving means such that the time average of the signal applied to the receiving means during the second semicycle tends to equal that of the first semicycle.

5. A radiometer for detecting the presence of thermally radiated energy including an antenna for producing a first signal corresponding to the thermal energy radiated thereto, first and second reference sources for providing second and third signals corresponding to respective constant magnitudes of thermal energy, the first and second reference sources representing hot and cold signal sources respectively, receiving means having an input and an output and adapted to produce an output signal corresponding to the difference between input signals alternately applied to the input thereof during respective half-cycles of operation, switching means connected to the input of the receiving means and adapted to couple the input alternately to the antenna and the first and second reference sources during one cycle of operation, reference timing means interconnected with the switching means thereby to control the switching means such that the receiving means input is coupled to the antenna during one half of the cycle, and feedback means connected between the output of the receiving means and the switching means, the feedback means being responsive to the receiving means output signal to control the switching means during the other half of the cycle whereby the input of the receiving means is connected to the first reference source during a predetermined portion of the other half of the cycle and to the second reference source for the remainder thereof, the predetermined portion being such that the time average of the signals coupled to the receiving means input during the other half of the cycle tends to equal the signal coupled to the receiving means input during the one half of the cycle.

6. A radiometer for detecting the presence of a target radiating microwave energy comprising the combination of an antenna for producing a first signal related to the temperature of a target radiating microwave energy thereto, first and second reference sources of energy of constant predetermined magnitudes, the magnitude of the energy from the first reference source being substantially greater than that of the second, energy transmitting means, a first switch connected to one end of the energy transmitting means to couple the one end alternately to the first and second reference sources with reciprocally variable periods whereby a variable second signal is provided at the other end of the energy transmitting means related to the respective energies received from the first and second reference sources, receiving means having input and output connections and being adapted to produce an output signal corresponding to the difference between input signals alternately applied thereto, a second switch connected to the input connection of the receiving means to couple the input connection alternately to the antenna and the other end of the energy transmitting means, the period of operation of the second switch being a multiple of the period of the first whereby the output of the receiving means corresponds to the difference between the first and second signals.

7. A radiometer for detecting the presence and magnitude of thermally radiated microwave energy including an antenna for producing a first signal corresponding to the magnitude of microwave energy radiated thereto, first and second reference sources of relatively high and low thermal energy signals respectively, a receiver having an input and an output and adapted to produce an output signal having a magnitude proportional to the average of the difference between input signals alternately applied thereto during respective half-cycles of operation and a phase related to the polarity of the difference, energy transmitting means, a first switch connected to one end of the energy transmitting means to couple the one end alternately to the first and second reference sources whereby a variable second signal related to the respective energies received from the first and second reference sources appears at the other end of the energy transmitting means, a second switch connected to the input of the receiver to couple the input alternately to the antenna and the other end of the energy transmitting means during first and second half-cycles of operation, a reference timing source of periodic signals, phase detection means having an input connected to the output of the receiver, first and second switch driving means operatively connected with the first and second switches respectively, the first and second switch driving means being connected to the reference timing source and responsive to the signals produced therein, the second switch driving means also being connected to the output of the phase detection means and responsive to the signals received therefrom to connect the one end of the energy transmitting means to the first reference source during one portion of the second half-cycle of operation of the second switch and to the second reference source during the remaining portion of the second half-cycle of the second switch, the time ratio of the one and remaining portions of the second half-cycle being related to the average of the difference between the first and second signals.

8. A method of distinguishing between a background radiating microwave energy of a first magnitude and a body radiating microwave energy of a second magnitude different from the first magnitude, the method comprising the steps of alternately switching at a fixed rate the input of a radiometer receiver between an antenna upon which microwave energy from the background and body may be incident and a reference source of constant magnitude microwave energy for first and second time periods respectively, turning the reference source on and off in a cyclical manner, the respective periods of on and off states of the reference source being reciprocally variable whereby the sum of the on and off time periods is a constant, and varying the periods of the on and off states such that the difference between the inputs to the receiver during the first and second time periods is a predetermined value when only the microwave energy radiated from the background is incident upon the antenna.

9. A method of detecting the presence of microwave energy radiating bodies comprising the steps of switching the input of a radiometer receiver to an antenna responsive to microwave energy during the first half of a constant period switching cycle, switching the input to a reference source of constant magnitude microwave energy during the second half of the switching cycle, and activating the reference source for a sufficient portion of the second half-cycle such that the time average of the input to the receiver during the second half-cycle is equal to that of the first half-cycle.

10. A method of detecting the presence of microwave energy radiating bodies comprising the steps of switching the input of a radiometer receiver to an antenna responsive to microwave energy during the first part of a constant period switching cycle, switching the input to a reference source of constant magnitude microwave energy during the second part of the switching cycle, comparing the time averages of the inputs to the receiver applied during respective part-cycles and generating an output signal related to the difference therebetween, and activating the reference source for a sufficient portion of the second part of the cycle such that the output signal is a predetermined value.

11. A method of determining the magnitude of thermal microwave energy radiated to an antenna comprising the steps of switching the input of a radiometer receiver to the antenna during a first half-cycle of switch operation, switching the input of the receiver between hot and cold reference sources during the second half-cycle of switch operation, comparing the time averages of the first and second half-cycle receiver inputs and generating an output signal related to the difference therebetween, and varying the respective portions of the second half-cycle during which the receiver input is switched to the hot and cold reference sources whereby the output signal assumes a predetermined constant value.

12. A method of detecting the presence of a body radiating microwave energy comprising the steps of connecting the input of a radiometer receiver to an antenna responsive to microwave energy during the first portion of a fixed period, connecting the input to a reference termination during the remaining portion of the period, supplying microwave energy at a constant magnitude to the reference termination for a sufficient part of the second portion such that the time average of the input to the receiver during the second portion is equal to that of the first portion, and measuring the amount of energy supplied to the reference termination.

References Cited by the Examiner

UNITED STATES PATENTS 2,698,433   12/1954   Ringoen _____ 250—83.3 X
3,056,958   10/1962   Anderson _____ 250—83.3 X

OTHER REFERENCES

The Measurement of Thermal Radiation at Microwave Frequencies, by R. H. Dicke, from The Review of Scientific Instruments, vol. 17, No. 7, July 1946, pp. 268–275.

RALPH G. NILSON, *Primary Examiner.*